(12) United States Patent
Schindler

(10) Patent No.: US 6,212,594 B1
(45) Date of Patent: Apr. 3, 2001

(54) TIMER WITH FIXED AND PROGRAMMABLE INTERRUPT PERIODS

(75) Inventor: Frederick R. Schindler, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/239,903

(22) Filed: Jan. 29, 1999

(51) Int. Cl.[7] ....................................... G06F 9/48
(52) U.S. Cl. ............................. 710/266; 710/260
(58) Field of Search ............................ 710/266, 260, 710/48; 713/502; 326/37; 340/825.06; 361/683

(56) References Cited

U.S. PATENT DOCUMENTS 5,307,459 * 4/1994 Petersen et al. .
6,064,646 * 5/2000 Shal et al. .

* cited by examiner

*Primary Examiner*—Gopal C. Ray
(74) *Attorney, Agent, or Firm*—Sierra Patent Group, Ltd.

(57) ABSTRACT

A method for causing two programmable interrupts to take place is described herein, using a counter having an output having an adjustable period, a first register which controls the length of the total period of the counter, a second register which controls the length of the second portion of the period of the counter cycle, the steps in the method comprising loading the first register with a first value, loading the second register with a second value, simultaneously causing the counter to count down from said first value to zero, and causing an output of a timer to be a binary "0" during a first portion of the counter period, comparing the value of the first register to the value of the second register, causing, when the value of the first register and the second register are equal, the output of the counter to be a binary "1" until the value of the first register becomes zero.

8 Claims, 3 Drawing Sheets

TIMER WITH FIXED AND PROGRAMMABLE INTERRUPT PERIODS

BACKGROUND OF THE INVENTION

1. Field of the Invention

The present invention relates to electronic systems utilizing interrupts. More particularly, the present invention relates to a method and apparatus for generating two programmable interrupts, with one of these interrupts being triggered within the other. Both interrupts are triggered within the maximum time interval of a timer.

2. The Background Art

Modern integrated circuits utilize clock signals, interrupts, and signals having high states and low states in order to operate properly.

Interrupts are signals which are typically related to microprocessors, and usually indicate that a particular action needs to occur. For instance, an interrupt may be asserted when a device attached to the system containing the microprocessor needs to be serviced. In another instance, an interrupt may be asserted when an interval of time has passed.

Occasionally, when transmitting information from one circuit to another, it is necessary to encode that information in some way. However, the conventional methods are sometimes inadequate for the job. The present invention provides a method and apparatus for providing two programmable interrupts which may be used in many ways; to transmit numerical values from one circuit to another, to digitally transmit voltage or current data, etc.

SUMMARY OF THE INVENTION

A method for causing two programmable interrupts to take place is described herein, using a counter having an output having an adjustable period, a first register which controls the length of the total period of the counter, a second register which controls the length of the second portion of the period of the counter cycle, the steps in the method comprising loading the first register with a first value, loading the second register with a second value, simultaneously causing the counter to count down from said first value to zero, and causing an output of the timer to be a binary "0" during a first portion of the counter period, comparing the value of the first register to the value of the second register, causing, when the value of the first register and the second register are equal, said output of the counter to be a binary "1" until the value of the first register becomes zero.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

The goal of the present invention is to provide an output signal which has a variable period, and a variable duty cycle. One register controls the period of the output signal, and a second register controls the timing of a reverse in the state of the output signal from low to high, or from high to low. Longer periods allow for a better resolution on the timing of the reversal of the state, but have a longer latency to when a new reversal can be performed with the same resolution. Conversely, shorter periods provide for less resolution, but the latency is shorter. Thus, there is a tradeoff between latency and resolution that a designer may use to their advantage when designing systems which incorporate the present invention.

Figure 1:
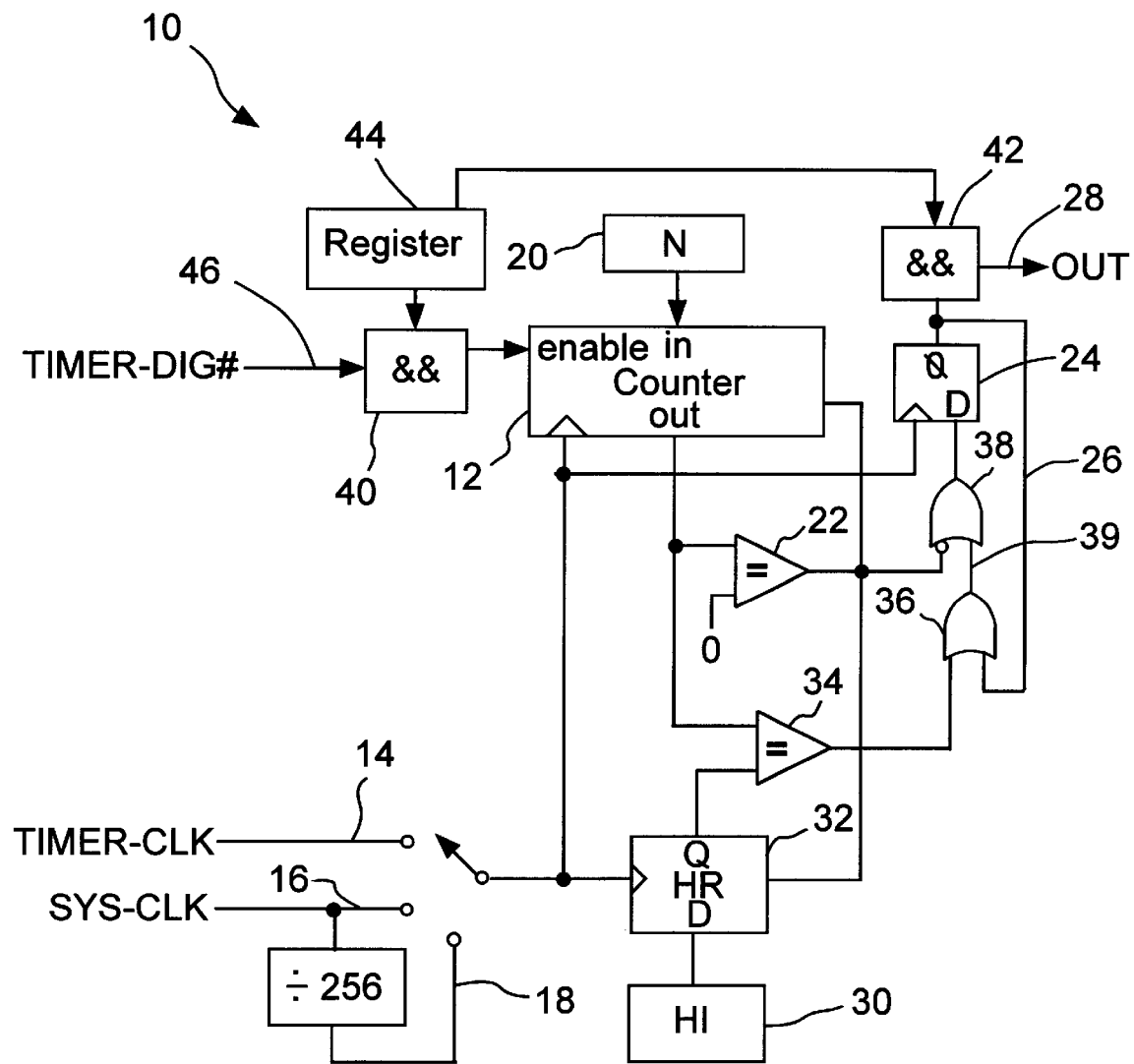
FIG. 1 is a block diagram of a presently preferred embodiment of the present invention.

FIG. 1 is a block diagram of a presently preferred embodiment of the present invention.

Referring to FIG. 1, system 10 comprises counter 12 which may be clocked by a signal on a timer clock pin 14, a system clock pin 16, or a prescaled clock pin 18. In a presently preferred embodiment of the present invention, the signal provided on prescaled system clock pin 18 is an externally supplied clock frequency, divided by 256. Thus, for a system clock frequency of 200 MHz, the frequency of the clock signal provided at prescaled clock pin 18 is 200 Mhz divided by 256, or approximately 781 KHz. Those of ordinary skill in the art will readily recognize that the clock frequency specified herein is only an one example out of millions of possible clock frequencies, and that system designers incorporating the present invention into their designs will need to consider their particular implementation of the present invention, when deciding what clock frequency to use, and whether to use the system clock, or an independent clock.

Coupled to counter 12 is N register 20 which defines the period of counter 12. When the system is initialized, the value of N register 20 is loaded into counter 12. Unless disabled by circuits to be described in later paragraphs, counter 12 then begins to count down from the loaded value towards zero.

During initialization, the output of counter 12 is forced to zero, causing the output of comparator 22 to be high, forcing the output of flip-flop 24 to be low at the next clock transition, causing feedback loop 26 to be low. Since the output of flip flop 24 is low, the output 28 of system 10 is also low.

H1 register 30 contains the counter value at which it is desired to cause system output 28 to change state from low to high, or from high to low. At initialization, the value of H1 register 30 is loaded into H2 register 32. In the presently preferred embodiment, output 28 is low when the counter 12 period begins, and switches high on the rising edge of the clock cycle following the determination that the output of counter 12 equals the value stored in H2 register 32.

One input to comparator 34 is H2 register 32, and a second input to comparator 34 is the output of counter 12. Thus, the output of comparator 34 is low unless the output of counter 12 equals the value stored in H2 register 32.

Recall that upon initialization, feedback loop 26 is low. Assuming the value of H2 register 32 is not equal to the value stored in N register 20, the output of comparator 34 is also low. Thus, the output of OR gate 36 is low, causing the output of AND gate 38 to be low. Since the output of flip flop 24 follows the output of AND gate 38 on the rising edge of the next clock cycle, the output of flip flop 24 is also low, and the output 28 of the system 10 is low.

At some time during operation, the value of H2 register 32 will equal the output of counter 12, causing the output of comparator 34 to be high. At that time, the output of OR gate 36 will switch high, causing an input 39 of AND gate 38 to be high. If the value of H2 register 32 is nonzero, then the output of comparator 22 is low, since the count is equal to H2 register 32 which is nonzero. Since the inverting input of AND gate 38 is low, and the noninverting input of AND gate 38 is high, the output of AND gate 38 is high, causing feedback loop 26 to be high, and output 28 of system 10 to switch high on the rising edge of the next clock cycle.

Since the output of comparator 34 is high only when the output of counter 12 equals the valve of H2 register 32, the output of comparator 34 will be high for only one clock cycle. All other times, the output of comparator 34 will be low, thus causing feedback loop 26 to control the output of OR gate 36.

At some time later, the output of counter 12 reaches zero, causing the output of comparator 22 to be high. Thus the inverting input of AND gate 38 is high, causing the output of AND gate 38 to be low, causing feedback loop 26 to be low at the next clock transition, causing output 28 of system 10 to be low, ending the period.

At times, a user of system may wish to disable the output of counter 12, or the output 28 of system 10. To accomplish this, AND gates 40 and 42 are provided, together with register 44. Register 44 may comprise unused bits from N register 20, H1 register 30, or H2 register 32, depending on the particular design employing the present invention.

Figure 2A:
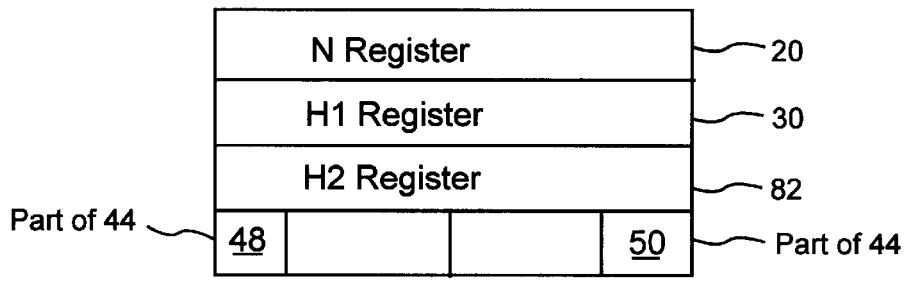
FIGS. 2A, 2B and 2C are a drawing showing one possible arrangement of data registers used in a presently preferred embodiment of the present invention.
Figure 2B:
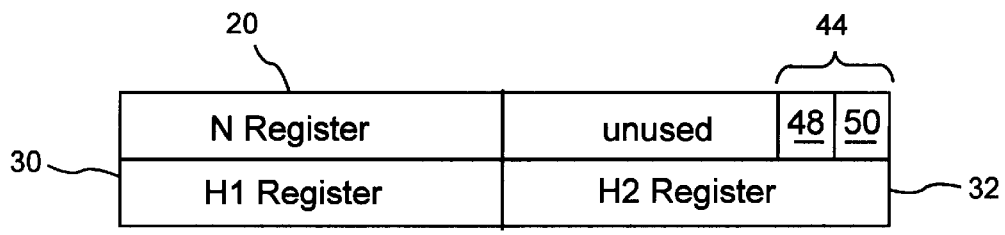
Figure 2C:
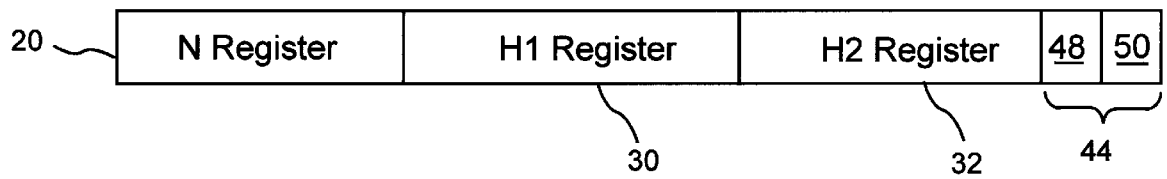

FIGS. 2A, 2B, and 2C depict alternate embodiments of the registers employed in a presently preferred embodiment of the present invention.

Briefly referring to FIGS. 2A, 2B, and 2C, there are many different configurations of registers which will work with the present invention. For example, FIG. 2A shows N register 20, H1 register 30, H2 register 32, and register 44 in separate, non-adjacent memory spaces.

FIG. 2B shows these registers sharing space, such as when DWORDS for a given design are 32-bits wide, and H1 register 30 and H2 register 32 are each 16 bits wide. In this example, N Register 20 might be 16 bits wide, leaving 2 bits, one for each bit required for register 44.

FIG. 2C shows the four registers utilizing the same DWORD space, such as when N register 20, H1 register 30, H2 register 32 are each 8 bits wide, and register 44 requires 2 bits. Since the total register requirement is 26 bits, these registers may be located in a single 32 bit DWORD.

Referring again to FIG. 1, coupled through AND gate 40 to counter 10 is timer disable pin 46. AND gate 40 performs a logical AND between the value of the signal at timer disable pin 46 and counter enable bit 48 inside register 44. Thus, counter enable bit 48 and the signal at timer disable pin 46 must each contain a binary value of "1" in order to enable the output of counter 10. This condition allows either a hardware condition or a software condition to disable the counter, if desired, depending on the wishes of the designer.

In alternate embodiments contemplated by the inventor, the logic states required to enable the counter could be reversed, thus providing for a binary "0" at each of the counter enable bit 48 and timer disable pin 46 to enable counter 12. This means that AND gate 40 would, in this alternate embodiment, be replaced by a NOR gate, so that a binary "0" on both inputs would cause the enabling binary "1" at the counter enable input.

A special case exists when the value of H1 register 30, when the system is initialized, equals the value of N register 20. If so, the output of comparator 34 switches high immediately after the counter is loaded with the contents of N register 20, causing the output of flip flop 24 to be high on the rising edge of the next clock cycle. Thus, output 28 of system 10 will be high for all but the first clock cycle with the period defined by N register 20. Once again, when output of counter 12 is zero, output 28 of system 10 will switch state from high to low.

In a presently preferred embodiment of the present invention, register 44, in addition to comprising counter enable bit 48, contains an output enable bit 50. Output enable bit 50 is provided as one input to AND gate 42. The second input to AND gate 42 is provided from flip-flop 24. Thus, when output enable bit 50 is low, the output of system 10 is low, no matter what else is happening within system 10. When the output enable bit 50 is high, output 28 from system 10 follows the output of flip-flop 24.

The period of counter 10 is defined by N register 20, and the "high time" enable value is defined by H1 register 30. In a presently preferred embodiment, these two values are 32 bits wide, providing for a resolution of 5 ns and a maximum clock period of 21 seconds, when using counter 12 in a system having a clock frequency of 200 MHz. The integer value of the N register 20 at the beginning of a cycle of counter 12 is one less than the number of clock cycles contained within the period of the output of counter 12. Thus, if N register 20 contains a value of 1999, the period of counter 12 will be 1999+1=2000 system clock cycles.

Figure 3:
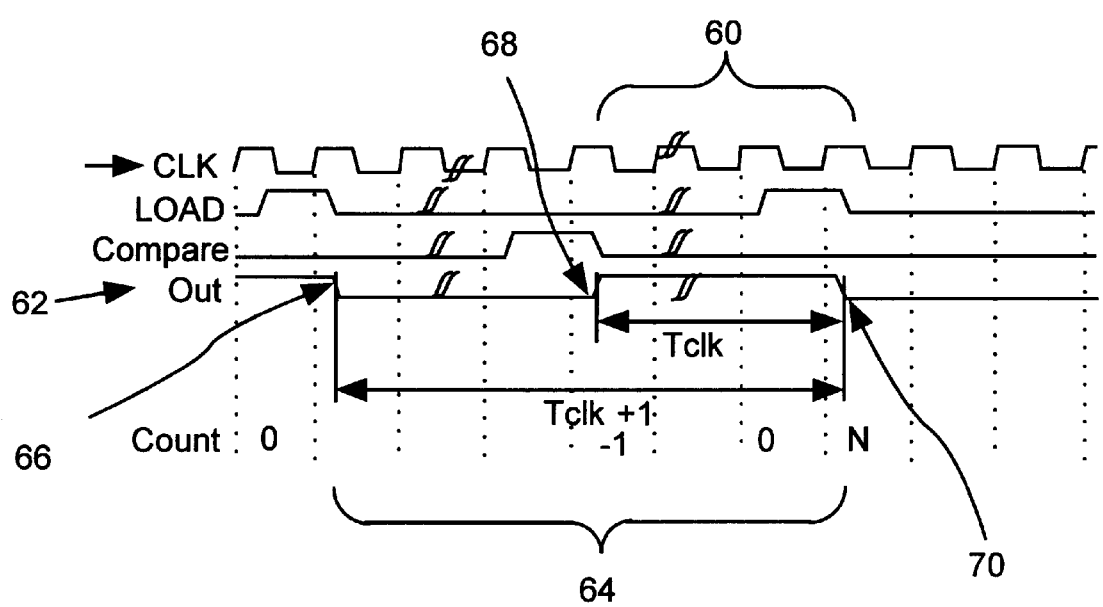
FIG. 3 is a signal transition chart showing signal transitions as they are operated upon by a presently preferred embodiment of the present invention.

FIG. 3 is a signal transition chart showing signal transitions as they are operated upon by a presently preferred embodiment of the present invention.

Referring to FIG. 3, clock signal 60 is provided at some desired frequency. In a presently preferred embodiment, the clock signal is 200 MHz, and is not prescaled prior to being provided to counter 12. However, it is contemplated by the inventor that the clock signal may be virtually any reasonable frequency, prescaled or not, depending on the task the system designer intends to accomplish.

Counter output signal 62 shows a period Tclk(N+1) having reference designation 64. As previously described, this period of counter 12 is one system clock cycle more than the value of the N register 20 at the beginning of that counter cycle.

If it is desired that a next period of counter 12 be the same as the previous period, the same value of N is reloaded for that next period, and the counter continues to operate as before. If a new period of counter 12 is desired, a new value of N may be loaded into the N register 20 at any time, and the counter restarted.

In a presently preferred embodiment of the present invention, the H1 register 30 may only be loaded with a new value when a new value is loaded into N register 20. However, it is contemplated that the H2 register 32 may be loaded with a new value anytime that the new value to be loaded and the present value of H2 register 32 are both smaller than the counter 12 at the time. This requirement ensures that there is a complete cycle of the output of counter 12.

In a presently preferred embodiment of the present invention, the output of system 10 switches from high to low when a cycle begins, as seen at reference system 10 will switch high, to finish the cycle. This point 68 is controlled by the value of H2 register 32, as previously described.

The cycle of system 10 terminates at reference designation 70, when the N register reaches zero, causing the output of system 10 to switch low.

Those of ordinary skill in the art will readily recognize that the width of the N register controls the maximum resolution of the counter. Thus, if the N register is 4 bits wide, the maximum value of N is $2^4=16$. Thus, the maximum period of counter 12 would be 16 clock cycles. By increasing the width of the N register 20, the system designer can exponentially increase the maximum period of the output of counter 12, and correspondingly increase the resolution of the ratio H2/(N+1), the ratio of the duration of the second portion of the cycle of counter 12 to the total duration of the cycle of counter 12. Thus there is a tradeoff between latency and resolution.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for causing two programmable interrupts to take place, using a counter having an output and an adjustable period, a first register which controls the length of the total period of the counter, a second register which controls the length of the second portion of the period of the counter cycle, the steps in the method comprising:

loading a first register with a first value;

loading a second register with a second value;

simultaneously causing a counter to count down from said first value to zero, and causing an output representing a first interrupt signal of a timer to be a binary "0" during a first portion of the counter period;

comparing the value of said first register to the value of said second register; and causing, said output representing a second interrupt signal of said counter to be a binary "1", when said value of said first register and said second register are equal and until the value of said first register becomes zero.

2. The method of claim 1 wherein said value loaded into said second register is less than said value loaded into said first register.

3. The method of claim 1 wherein said value loaded into said second register is equal to said value loaded into said first register.

4. A method for causing two programmable interrupts to take place, using a counter having an output and an adjustable period, a first register which controls the length of the total period of the counter, a second register which controls the length of the second portion of the period of the counter cycle, the steps in the method comprising:

loading a first register with a first value;

loading a second register with a second value which is less than said first value;

simultaneously causing a counter to count down from said first value to zero, and causing an output representing a first interrupt signal of a timer to be a binary "1" during a first portion of the counter period;

comparing the value of said first register to the value of said second register; and causing, said output representing a second interrupt signal of said counter to be a binary "0", when the value of said first register and said second register are equal and until the value of said first register becomes zero.

5. A method for causing two programmable interrupt to take place, using a counter having an output and an adjustable period, a first register which controls the length of the total period of the counter, a second register which controls the length of the second portion of the period of the counter cycle, the steps in the method comprising:

loading a first register with a first value;

loading a second register with a second value which is less than said first value;

simultaneously causing a counter to count down from said first value to zero, and causing an output representing a first interrupt signal of a timer to be a binary "0" during a first portion of the counter period;

comparing the value of said first register to the value of said second register; and causing, said output representing a second interrupt signal of said counter to be a binary "1", when the value of said first register and said second register are equal and until the value of said first register becomes zero.

6. A method for causing two programmable interrupts to take place, using a counter having an output and an adjustable period, a first register which controls the length of the total period of the counter, a second register which controls the length of the second portion of the period of the counter cycle, the steps in the method comprising:

loading a first register with a first value;

loading a second register with a second value which is less than said first value;

simultaneously causing a counter to count up from a value of zero to said first value, and causing an output representing a first interrupt signal of a timer to be binary "1" during a first portion of the counter period;

comparing the value of said first register to the value of said second register; and causing, said output representing a second interrupt signal of said counter to be a binary "0", when the value of said first register and said second register are equal and until the value of said first register becomes zero.

7. An apparatus for providing two programmable interrupts comprising:

a counter having a first input, a second input, and an output;

a first register coupled to said first input of said counter, the contents of said first register, at the beginning of a period of said counter, determining the period of the next cycle of said counter;

a second register coupled to said second input of said counter, the contents of said second register, at the beginning of a period of said counter, determining the duration of the second portion of said next cycle of said counter output; and wherein the output representing a first interrupt signal of said counter is high during a first portion of said period of said counter, and wherein said output representing a second interrupt signal is low during said second portion of said counter.

8. An apparatus for providing two programmable interrupts comprising:

a counter having a first input, a second input, and an output;

a first register coupled to said first input of said counter, the contents of said first register, at the beginning of a period of said counter, determining the period of the next cycle of said counter;

a second register coupled to said second input of said counter, the contents of said second register, at the beginning of a period of said counter, determining the duration of the second portion of said next cycle of said counter output; and wherein the output of said counter representing a first interrupt signal is low during a first portion of said period of said counter, and wherein said output representing a second interrupt signal high during said second portion of said counter.

* * * * *